(12) United States Patent
Gurin

(10) Patent No.: US 9,951,949 B1
(45) Date of Patent: Apr. 24, 2018

(54) ULTRA-HIGH ENERGY DENSITY AND EMISSIVITY FOR ENERGY CONVERSION

(71) Applicant: Michael H Gurin, Glenview, IL (US)

(72) Inventor: Michael H Gurin, Glenview, IL (US)

( * ) Notice: Subject to any disclaimer, the term of this patent is extended or adjusted under 35 U.S.C. 154(b) by 905 days.

(21) Appl. No.: 14/450,231

(22) Filed: Aug. 2, 2014

(51) Int. Cl.
*F23L 5/02* (2006.01)

(52) U.S. Cl.
CPC ..................... *F23L 5/02* (2013.01)

(58) Field of Classification Search
USPC .... 60/39.34, 39.35, 766, 767; 431/326, 328; 126/91 A, 92 AC, 92 C
See application file for complete search history.

(56) References Cited

U.S. PATENT DOCUMENTS

| | | | | |
|---|---|---|---|---|
| 5,932,885 A | * | 8/1999 | DeBellis | F23C 3/002 136/253 |
| 6,123,452 A | * | 9/2000 | Uchimura | G01N 3/60 374/57 |
| 6,669,822 B1 | * | 12/2003 | Fujimura | C01B 31/08 201/20 |
| 7,685,824 B2 | * | 3/2010 | Dahm | F02K 7/16 60/224 |
| 2009/0014059 A1 | * | 1/2009 | Radhakrishnan | H01L 31/02325 136/248 |
| 2011/0167889 A1 | * | 7/2011 | Myers | B21D 22/025 72/370.24 |
| 2011/0268235 A1 | * | 11/2011 | Gurin | C01B 35/023 376/100 |
| 2013/0276885 A1 | * | 10/2013 | Chen | H01L 31/0322 136/262 |

* cited by examiner

*Primary Examiner* — Avinash Savani
*Assistant Examiner* — Rabeeul Zuberi

(57) ABSTRACT

A solid-state energy conversion device in combination with an ultra-high energy density buoyant combustor generating high radiant, and high emissivity "heat" achieves ultra-high energy conversion efficiency and ultra-high radiant/emissive "flame" preferably creating electromagnetic waves, hot carriers, photons, phonons and/or plasmons created within the high buoyancy combustor to achieve high energy conversion rates. The buoyant combustor can alternatively operate void of the solid-state energy conversion to replace a traditional burner for boiler/furnace.

20 Claims, 10 Drawing Sheets

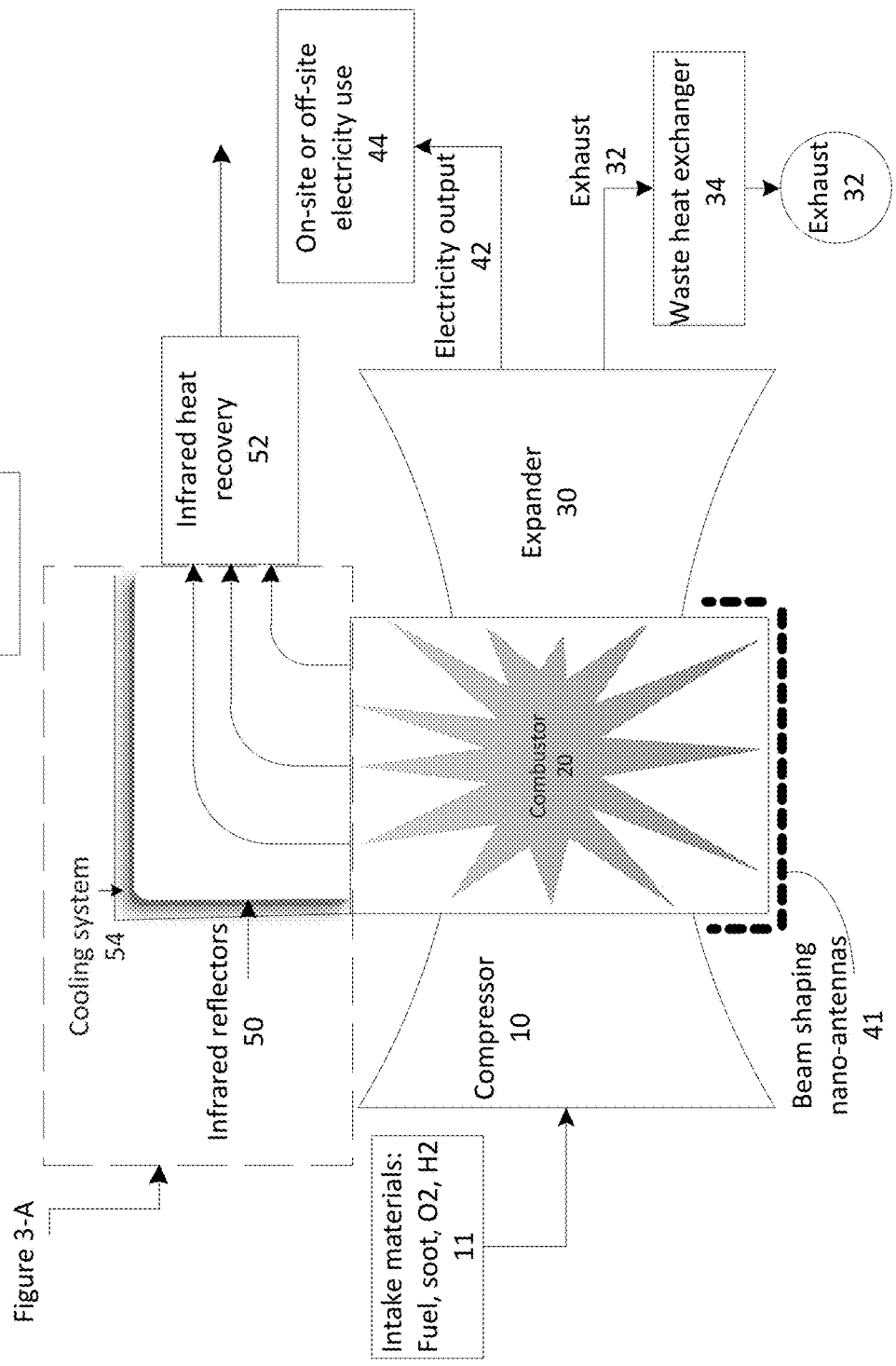

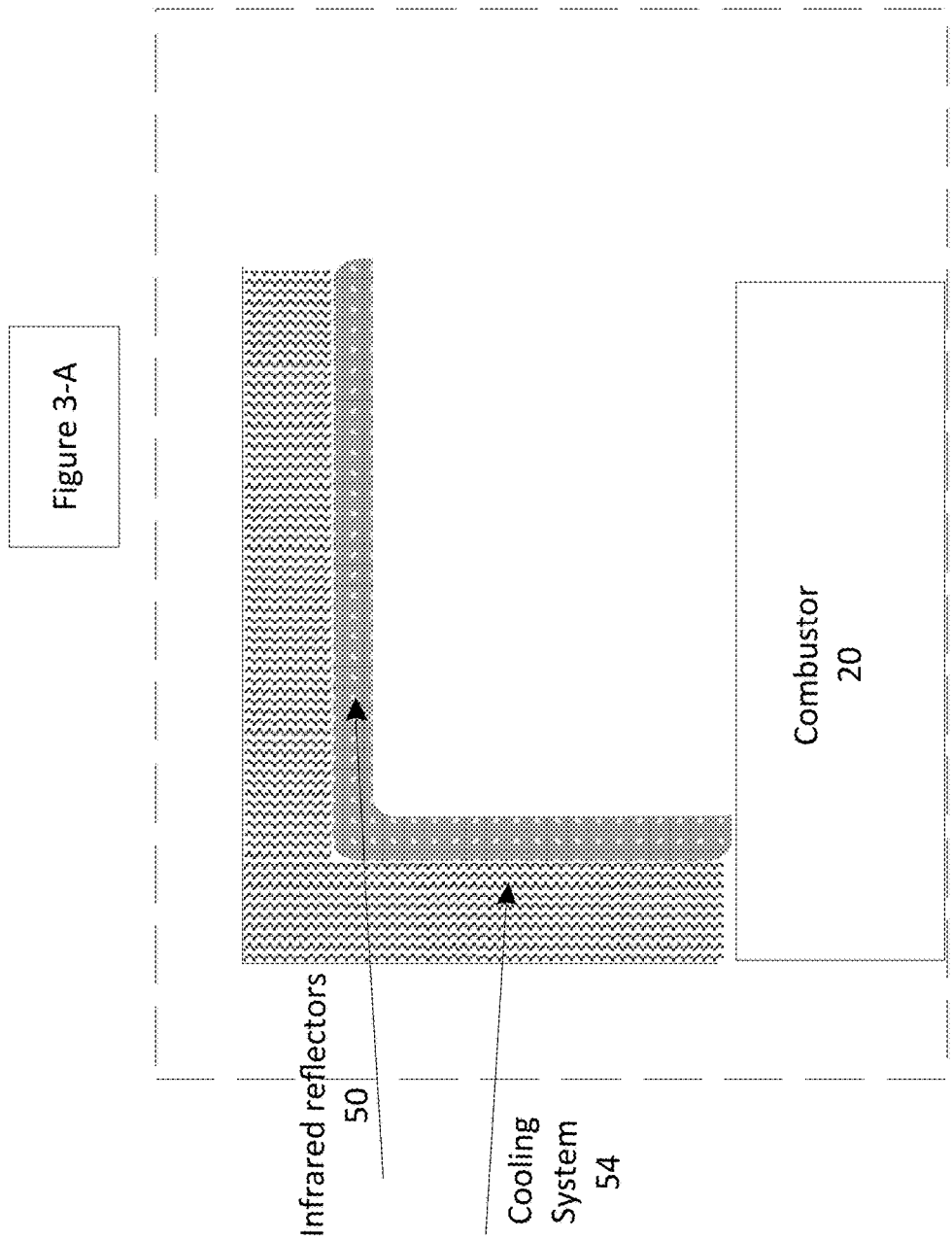

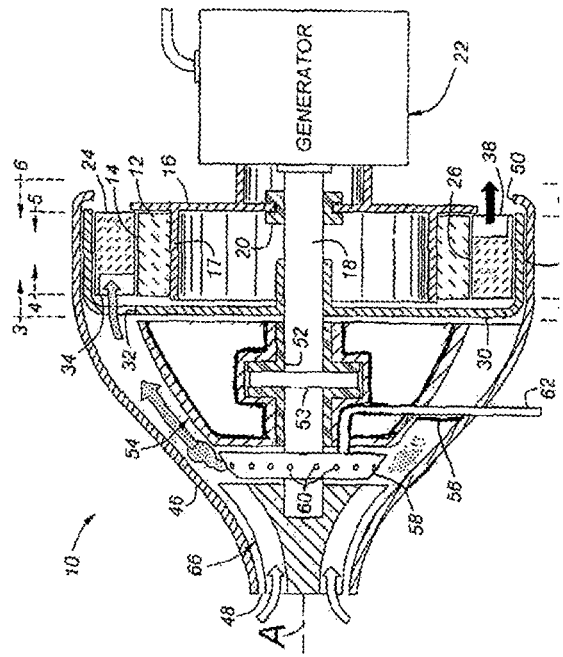
Figure 4-B
Prior Art
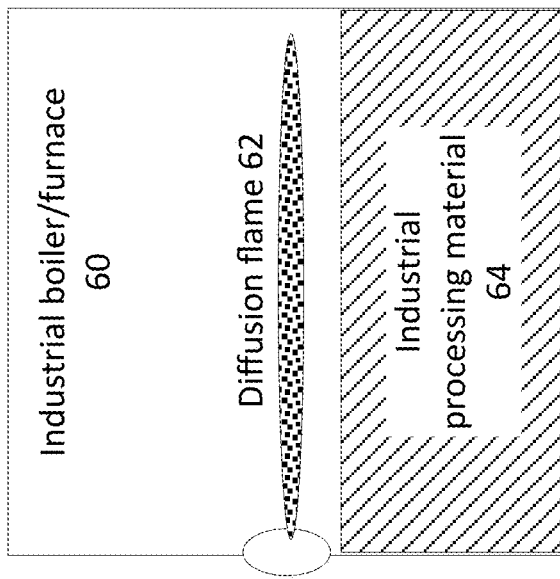
Figure 4-A
Prior Art

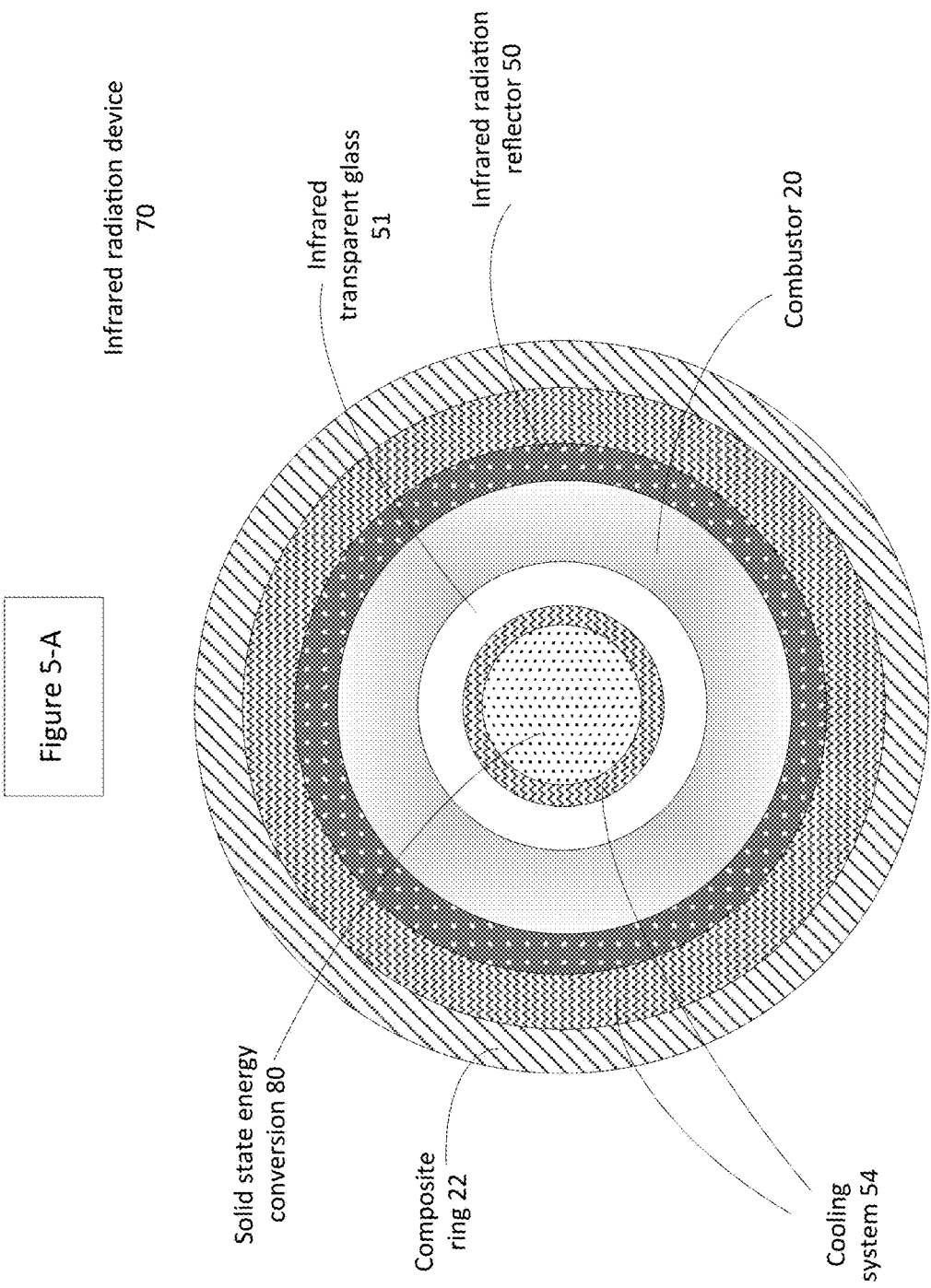
Figure 5-A

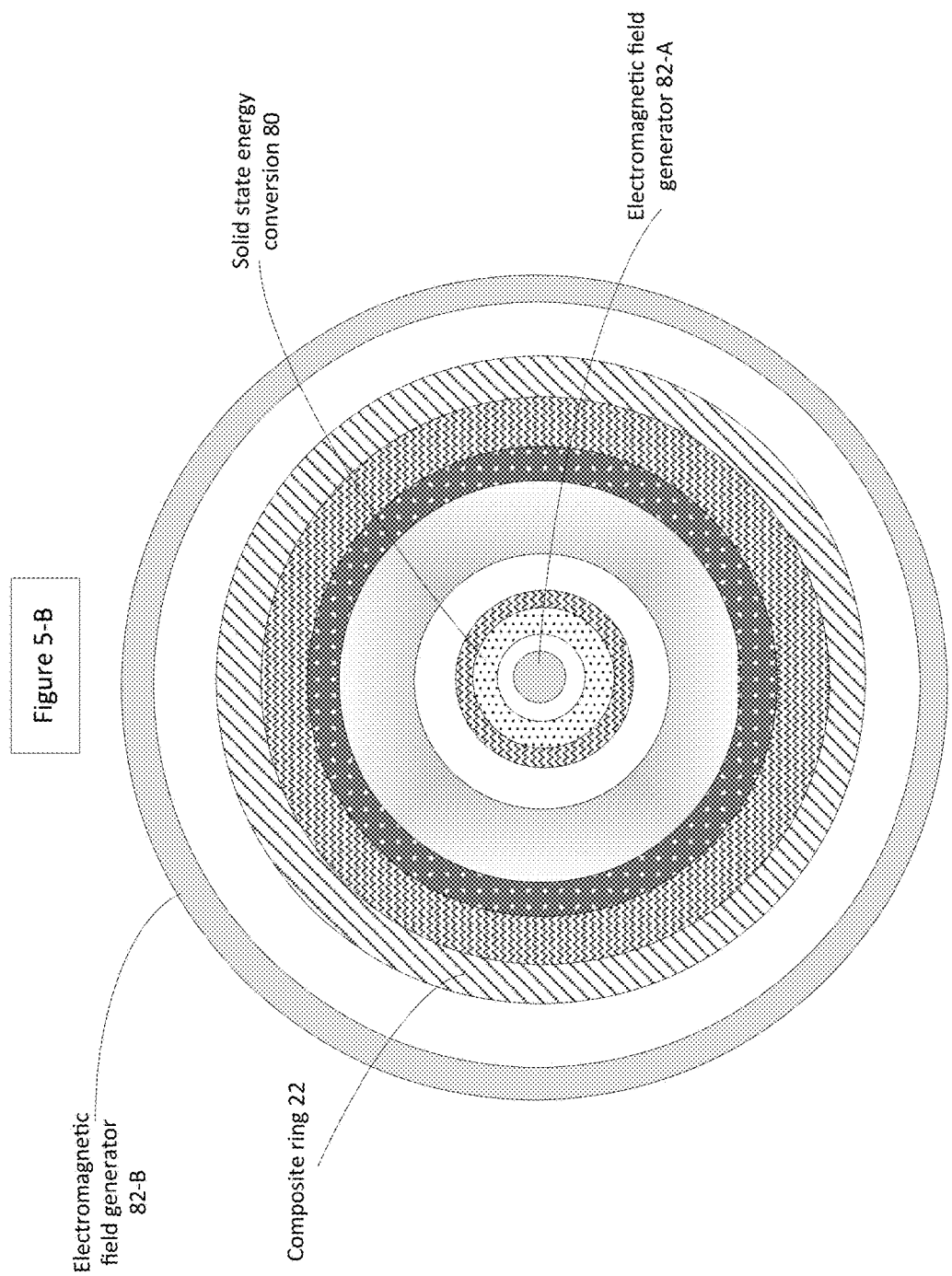
Figure 5-B

ULTRA-HIGH ENERGY DENSITY AND EMISSIVITY FOR ENERGY CONVERSION

FIELD OF INVENTION

The present invention generally relates to a high energy density buoyant combustor that generates high radiant, and high emissivity heat setting the stage for solid-state energy conversion into electricity, having combustor preferably rotating to create high forces and operating predominantly using buoyancy as compared to diffusion flame propagation. The integration of ultra-high frequency solid-state energy conversion uniquely leverages the resulting electromagnetic waves, hot carriers, photons, phonons and/or plasmons created within the high buoyancy combustor to achieve high electricity conversion rates first through aforementioned solid-state energy conversion and then secondarily mechanical thermodynamic cycle to achieve system electrical efficiencies greater than 60% combined hybrid efficiency.

BACKGROUND OF INVENTION

Due to a variety of factors including, but not limited to, global warming issues, fossil fuel availability and environmental impacts, crude oil price and availability issues, alternative power generation methods with increased efficiencies must be developed to reduce CO2 emissions and/or reduce operating costs. Industrial processes, including but not limited to cement, steel, refineries, and glass processing plants, have operational temperatures in excess of 1000 Fahrenheit. This temperature is in excess of typical temperatures exhausted from power generation cycles, preventing as known in the art Combined Heat and Power (CHP) operations in which waste heat is repurposed for a secondary function. Furthermore, many of these industrial processes are dominated by (or would benefit from) radiant heat transfer. A novel way of creating high radiant, high emissivity energy, with the concurrent creation of on-site electricity for a co-located industrial process is introduced.

SUMMARY OF INVENTION

The present invention is an ultra-high temperature, high radiant power production process, which emits ultra-high temperature, high emissivity radiation that is subsequently utilized within a secondary process, preferably with ultra-high frequency infrared energy conversion system or as high radiant, high emissivity energy in an industrial process, or other similar co-located process.

BRIEF DESCRIPTION OF DRAWINGS

FIG. 3 is a sequential flow diagram of another embodiment of a power generation engine with high radiant exhaust used with infrared heat recovery system for co-located industrial process.

FIG. 3-A is a close up of the designated area as shown in FIG. 4.

FIG. 4-A is prior art of a schematic diagram of a typical industrial boiler/furnace that uses a high radiant diffusion flame.

FIG. 4-B is prior art of a schematic diagram of a typical inside-out ramjet.

FIG. 5-A is a schematic diagram of one embodiment of a high emissivity infrared radiation device.

FIG. 5-B is a schematic diagram of another embodiment of a high emissivity infrared radiation device.

DETAILED DESCRIPTION OF INVENTION

Figure 1:
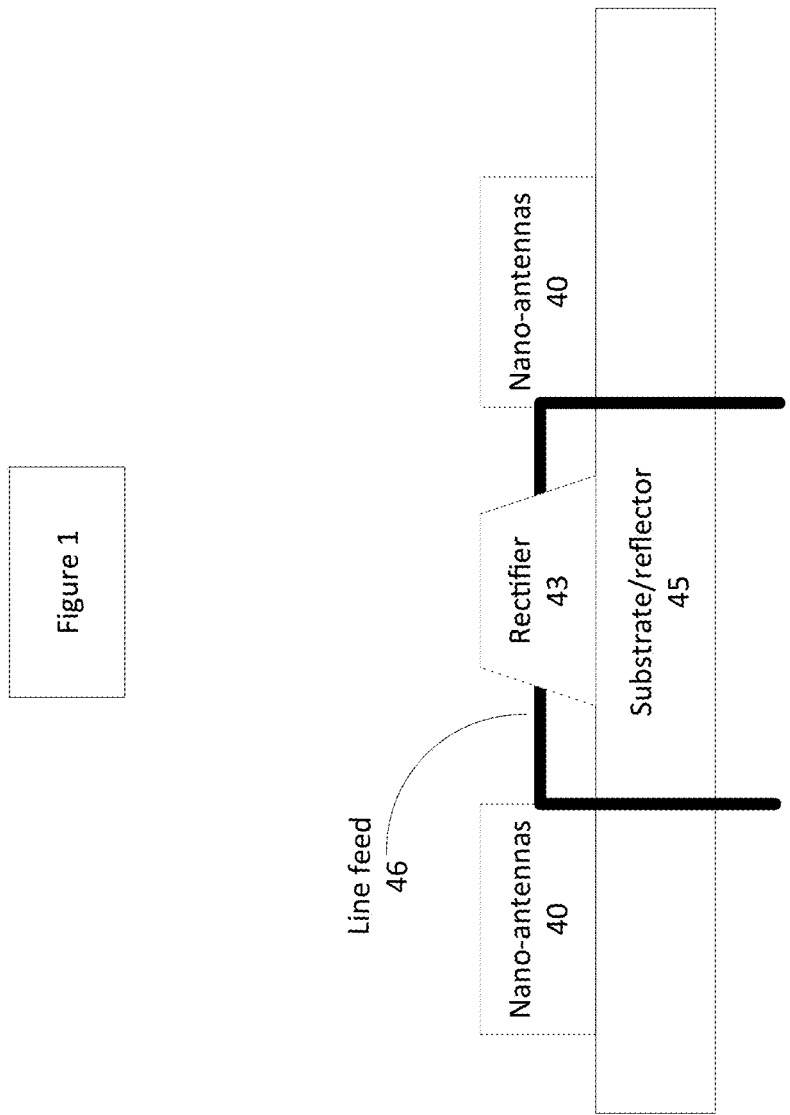
FIG. 1 is a schematic diagram of a typical nano-antenna component fabrication.

The term "buoyant combustor" refers to a combustion device that uses the difference in densities of the fuel and oxidant source within a high centrifugal force gravity field to maximize or minimize mixing to optimize the desired combustion reaction.

The term "high centrifugal", as used herein, includes forces generated by rotational speeds typically greater than 100 RPM in which combustion (particularly fuel and air mixing) is impacted by the buoyancy effect. In most cases the rotational speed is in excess of 10,000 RPM, with the particularly preferred rotational speeds in excess of 100,000 RPM. The buoyant combustor when having speeds in excess of at least 50,000 RPM has an energy density at least 5 times more compact as compared to a stationary combustor/burner.

The term "in thermal continuity" or "thermal communication", as used herein, includes the direct connection between the heat source and the heat sink whether or not a thermal interface material is used.

The term "fluid inlet" or "fluid inlet header", as used herein, includes the portion of a heat exchanger where the fluid flows into the heat exchanger.

The term "fluid discharge", as used herein, includes the portion of a heat exchanger where the fluid exits the heat exchanger. It is understood that a stator or an energy recuperator that can be respectively redirect or reduce the airflow velocity as know in the art can be further included as known in the art.

The term "stoichiometric excess" is an amount of at least one chemical reactant that is greater than the quantity of reactants within a balanced chemical reaction.

The term "ramjet" is a rotary device that eliminates the need for a conventional bladed compressor (when a ramjet compressor) and turbine (when a ramjet expander) as used in traditional gas turbine engines. One embodiment of a ramjet is an inside-out supersonic circumferential rotor having integrated varying-area shaped channels in its radially inward surface, in which compression, combustion and expansion occur. The "inside-out" design places all rotating parts under compressive centrifugal loading. U.S. Pat. No. 7,685,824 of Dahm is one such exemplary of an inside-out ramjet as depicted in FIG. 4-B.

The term "top cycle" is a power conversion cycle at the highest exergy state (i.e., having the maximum ability to produce useful work), also synonymous with topping cycle.

The term "oxidant source" is an air composition that contains oxygen ranging from 1 percent on a mass fraction basis to a highly enriched air composition up to 100 percent on a mass fraction basis, including the highly energetic monoatomic oxygen (O).

The terms "oxygen-enriched" and "oxygen-depleted" air refers to air having more or less oxygen, respectively, than expected levels in average incoming air.

The term "fuel" is a chemical reactant that is exothermic during an oxidation reaction. It is understood that the fuel can range from traditional petrochemical fuels to Brown's Gas as well as biofuels to monoatomic hydrogen.

The term "soot" is a form of amorphous carbon particles and is used to yield a homogeneous highly radiative flameless combustion.

The term "recuperator" is a method of recovering waste heat downstream of an expander and transferring the thermal energy upstream of either a compressor, turbocompressor or pump.

The term "exhaust port" is any method capable of discharging a working fluid that can include safety valve, pressure regulated valve, expansion device venting to atmosphere, etc.

The term "oxy-fuel process," used interchangeably with "oxy-fuel combustion," is the process of burning a fuel using pure oxygen or oxygen-enriched air as known in the art to reduce exhaust pollutants and increase overall system efficiency.

The term "separator" is any component that can partition exhaust into at least water and CO2 exhaust and could be a condenser, steam recompression, water adsorber, or other separators as known in the art.

The term "infrared energy," used interchangeably with "infrared radiation" or "infrared heat," refers to electromagnetic radiation in the approximate range of 700-1,000 nm and/or a frequency of 430 THz-300 GHz.

The term "industrial furnace" refers to the equipment used by industrial processes, including but not limited to cement, steel, refineries, and glass processing plants, which require ultra-high radiant energy for successful and efficient operation.

The term "ultra-high frequency infrared energy conversion system," used interchangeably with "nano-antennas" or "nantennas," are nanoscopic rectifying antennas that have the ability to convert electromagnetic radiation into electricity. In this embodiment, the preferred energy conversation system utilizes nano-antennas that can convert highly radiant, high emissivity infrared energy into usable electricity.

The term "beam shaping nano-antennas" are nano-antennas (see above) that have the ability to redirect and/or concentrate energy or light beams to a desired location.

The term "infrared radiation device" is any component that emits highly radiant, high emissivity energy. The preferred embodiment is a ramjet combustion engine with a transparent combustor section.

The term "infrared reflector" is any component that can recover highly radiant, infrared heat to transfer for co-located use. The component may require a cooling system as known in the art to protect the materials.

The term "solid-state energy conversion" is a device that converts radiant energy into electrical energy. One embodiment is an ultra-high frequency infrared energy conversion system as described above.

The utilization of the term "Boron-10" as used herein is the inclusion of Boron having a majority of the Boron in the isotope form of Boron-10 (i.e., greater than 50%), as compared to the natural ratio of Boron-10 isotope to other boron isotopes (typically Boron-11).

The term "monatomic", as used herein is hydrogen or oxygen that occurs as single atoms rather than the usual H2 or O2 seen in hydrogen or oxygen gas respectively. Monatomic atoms have a higher energy state, and quickly combine into their more stable lower energy state.

The term "Brown's Gas", as used herein is otherwise known as common duct electrolytic oxyhydrogen, such as by WaterTorch Collective, Ltd.

Here, as well as elsewhere in the specification and claims, individual numerical values and/or individual range limits can be combined to form non-disclosed ranges.

Exemplary embodiments of the present invention will now be discussed with reference to the attached Figures. Such embodiments are merely exemplary in nature. Furthermore, it is understand as known in the art that sensors to measure thermophysical properties including temperature and pressure are placed throughout the embodiments as known in the art, most notably positioned to measure at least one thermophysical parameter for at least one thermodynamic state point. The utilization of valves as standard mass flow regulators is assumed (i.e., not depicted) to be as known in the art and can also include variable flow devices, expansion valve, turboexpander, two way or three way valves. The utilization of methods to remove heat from the working fluid by a condensor (used interchangeably with condenser) is merely exemplary in nature as a thermal sink and can be substituted by any device having a temperature lower than the working fluid temperature including absorption heat pump desorber/generator, liquid desiccant dehumidifier, process boilers, process superheater, and domestic hot water. With regard to FIGS. 1 through 12, like reference numerals refer to like parts.

It is understood that virtually every embodiment of this invention can include CO2 sources such as calciners, high temperature furnaces, and fuel combustors.

Every configuration and embodiment has a control system and method of control to operate the power generation cycle(s) and industrial processes and to obtain optimal control of all primary and secondary operations to maximize revenue and minimize fuel consumption and CO2 emissions by tightly integrating co-located processes, particularly around concurrent oxygen production and electricity storage.

Turning to FIG. 1, FIG. 1 is a schematic diagram of a typical nano-antenna (also referred to as a nanoantenna) component fabrication as known in the art. The substrate/reflector 45 could be made of any appropriate material as known in the art. The rectifier 43 (also referred to as a rectenna) converts the energy captured by the nano-antennas 40 into direct current electricity via line feed 46.

Figure 2:
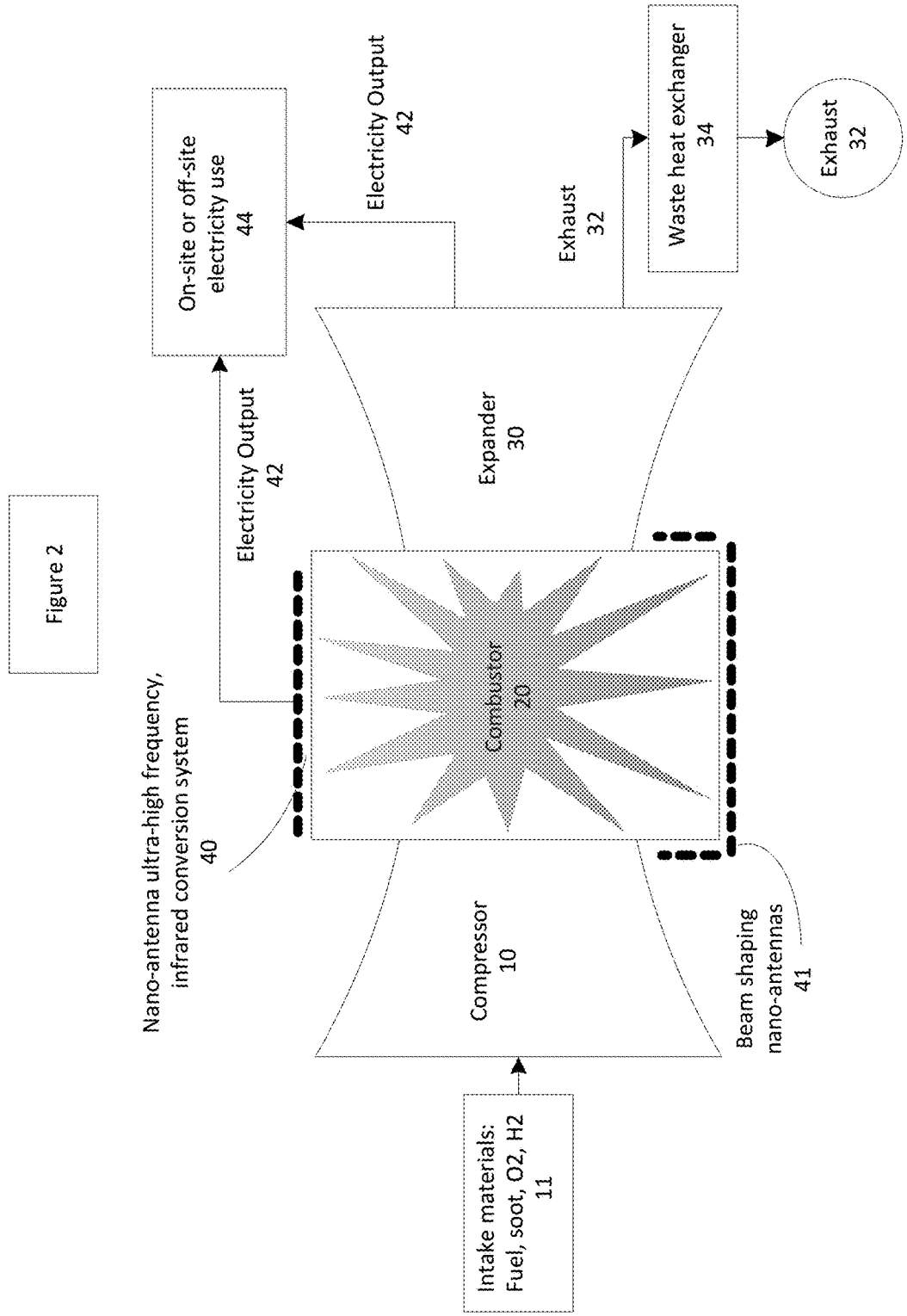
FIG. 2 is a sequential flow diagram of one embodiment of a power generation engine with high radiant exhaust used with ultra-high frequency infrared energy conversion system and beam shaping technology.

Turning to FIG. 2, FIG. 2 is a sequential flow diagram of one embodiment of a power generation engine, comprised of a compressor 10, combustor 20, and an expander 30. In this embodiment, the combustor 20 is made of transparent material as known in the art and emits high radiant energy. The combination of the intake materials, as known in the art, of fuel, soot, O2, and H2 11 is essential for creating the high radiant, high emissivity energy in the combustor 20. The preferred embodiment is an integrated ramjet combustion engine, which includes the compressor 10, the combustor 20, and expander 30 in a single engine with high efficiency and is highly compact. In this embodiment, the high radiant energy emitted by the combustor 20 is captured by an ultra-high frequency infrared energy conversion system 40, which generates electricity 42, which can be used on-site or off-site 44. On the sides opposite and/or adjacent to the nano-antennas infrared conversion system 40 are beam shaping nano-antennas 41, which have the ability to redirect the infrared energy from their sides to concentrate on the side with the nano-antennas infrared conversion system 40, allowing for complete (or near complete) utilization of emitted energy from the combustor 20. The configuration of the nano-antenna infrared conversion system 40 in relationship to the beam shaping nano-antennas 41 as shown is one possibility in this embodiment and other configurations are possible, as obvious to those in the art. The expander 30 of the engine also generates electricity 42, which can also be used on-site or off-site 44. The engine also generates high-grade exhaust 32, which can be turned into useful heat as known in the art through a waste heat recovery 34.

At least 300 ppm of soot (i.e., non-combusted fuel) is preferred to yield a homogeneous highly radiative flameless combustion (with a flux of greater than 200 kW per square meter, or preferably greater than 500 kW per square meter, and an emissivity greater than 0.1, or preferably greater than 0.8).

High emissivity is essential for high radiant heat transfer, a critical component of many industrial processes as known in the art, including steel, glass, cement, refinery operations, etc. Combustion provides significant residence time for air/oxygen and fuel to mix and for effective preheating of air/oxygen and fuel to mix to achieve homogeneous flameless combustion within the combustor and/or immediately thereafter within the boiler/furnace. The preferred combustion air temperature upstream of the buoyant combustor is above the autoignition temperature of the fuel, and preferably above 1200 degrees Fahrenheit.

Figure 6:
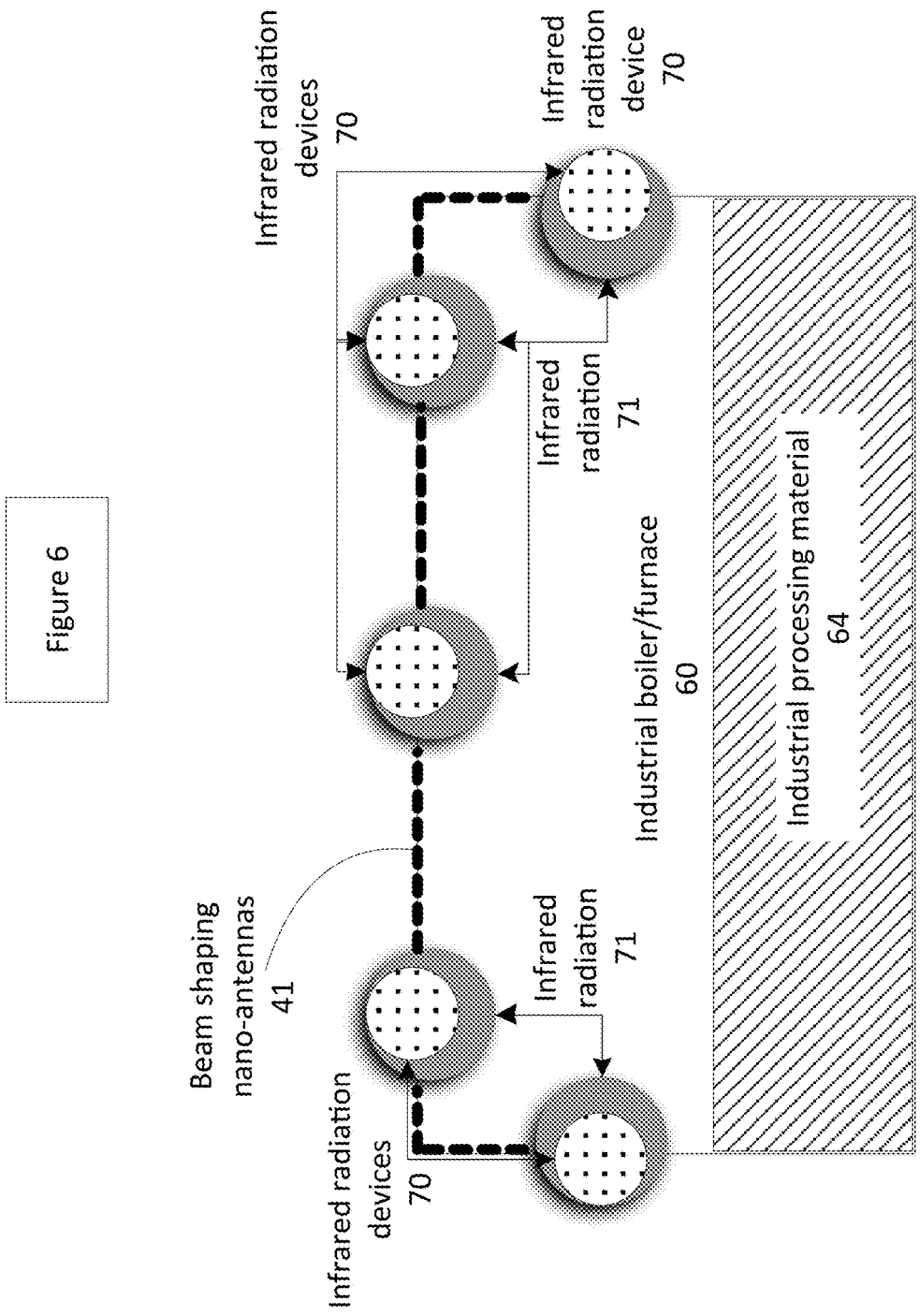
FIG. 6 is a schematic diagram of an industrial boiler/furnace utilizing the power generation engines as the source for high radiant, high emissivity energy and beam shaping nano-antennas as shown in FIG. 2.

Turning to FIG. 3, FIG. 3 is a sequential flow diagram identical to FIG. 2 except it utilizes infrared reflectors 50 and heat recovery 52 in order to use the high radiant, high emissivity energy in a co-located process, as known in the art where traditional radiant burners are utilized or shown in FIG. 6. Due to the high radiant heat, the reflectors may require a cooling system 54 to protect the equipment, as shown in FIG. 3-A.

Turning to FIG. 3-A, FIG. 3-A is a close up of the area as marked in FIG. 3. It includes the infrared reflectors 50, which redirect that high emissivity infrared energy emitted by the combustor 20. Because of the high radiant energy, a cooling system 54 may be required to remove extra heat from the reflectors 50, which could be a microchannel coil or other heat exchanger, used with a refrigerant or cooling fluid (e.g., glycol), as known in the art.

Turning to FIG. 4-A, FIG. 4-A is prior art of a schematic diagram of a typical industrial boiler/furnace 60 that uses a high radiant diffusion flame 62 in the melting/processing of material 64, such as iron ore, steel, aluminum or glass, as known in the art. The important element is the combustion and the creation of a radiant flame/flameless being internal of the boiler/furnace typically where air and fuel are injected into boiler/furnace through traditional stationary burner, notably as compared to the invention in which combustion process takes place within combustor.

Turning to FIG. 4-B, FIG. 4-B is prior art of a schematic diagram of a typical inside-out ramjet (ignore numeral references in this figure), as known in the art. The important elements are combustor being internal of a compression ring containing the combustor plus the compressor and expander.

Turning to FIG. 5-A, FIG. 5-A is a schematic diagram of one embodiment of a high emissivity infrared radiation device 70, as shown in FIGS. 1, 2, and 6. One preferred embodiment of this device is a ramjet, as described previously. The device is housed by the composite outer ring 22 that is manufactured to withstand the operating conditions as known in the art particularly of inside-out ramjets. Combustion is ideally contained within the combustor 20, though completion of combustion can extend beyond the combustor discharge. At the center of the device is the solid-state energy conversion system 80, the preferred embodiment being an ultra-high frequency infrared energy conversion system, as shown in FIG. 1 and described above, which converts the infrared radiation generated in the combustor 20. The infrared radiation reflector 50 redirects combustion radiation into the solid-state energy conversion 80, through the infrared transparent glass (or ceramic) 51 operable as both a window for the infrared energy and as a stator ring (the stator ring isolates the combustion gases from the industrial processing material section) with an optional beam shaping nanoantenna to redirect and/or distribute the emitted infrared energy homogenously (or in virtually any intensity mapping) towards the industrial processing material section. A cooling system 54 may be required at the interface of the composite outer ring 22 as depicted (and/or also adjoining the infrared transparent glass 51 and/or surrounding the solid-state energy conversion 80, in order to remove unwanted heat and to protect the device and materials. Another embodiment of a solid-state energy conversion device is an electromagnetic heat engine with magnetization and demagnetization frequency of greater than 1 Gigahertz (preferably greater than 1 Terahertz) as known in the art.

Turning to FIG. 5-B, FIG. 5-B is a schematic diagram of another embodiment of a high emissivity infrared radiation device 70. All components from FIG. 5-A are shown in FIG. 5-B, with the composite ring 22 and solid-state energy conversion 80 shown as reference. FIG. 5-B includes an optional embodiment of an electromagnetic field, induced by the electromagnetic field generators 82-A and 82-B. The induced electromagnetic field further enhances that all energy emitted from the buoyant combustor is redirected into the solid-state energy conversion device 80.

FIG. 6 is a schematic diagram of an industrial boiler/furnace (or any device that can benefit from radiant combustion as known in the art) 60 utilizing devices that emit infrared radiation 70, as shown in FIG. 3. In this embodiment, particularly preferably is a ramjet engine, as shown in FIG. 2 and FIG. 3, as the source for high radiant, high emissivity energy 71. The surrounding walls of the furnace may also include beam shaping nano-antennas 41 to redirect all (or almost all) infrared energy that contacts the walls back to the industrial processing material 64 to increase the effectiveness of the buoyant burner 60. The configuration of the infrared radiation devices 70 and the beam shaping nano-antennas 41 as shown is one possibility in this embodiment and other configurations are possible, as obvious to those in the art.

Figure 7:
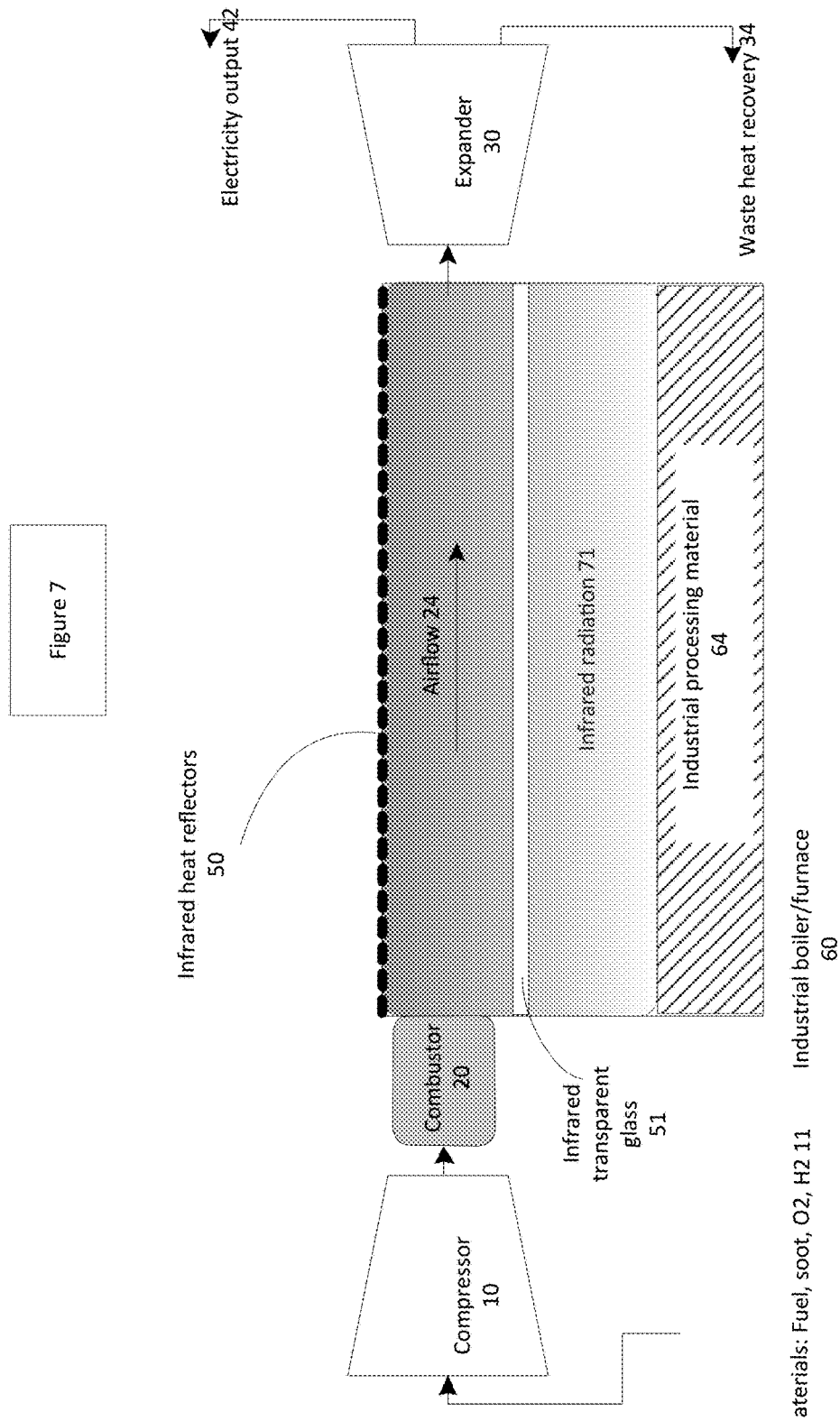
FIG. 7 is a schematic diagram of an industrial boiler/furnace utilizing the buoyant combustor to replace the traditional burner and isolating the radiant combustion exhaust from the balance of the boiler/furnace system.

Turning to FIG. 7, FIG. 7 is a schematic diagram of an industrial boiler/furnace 60 utilizing a power generation engine as shown in FIG. 2, comprised of compressor 10 with intake materials 11, combustor 20, and expander 30. As known in the art, the compressor can be directly connected to a motor (not depicted) or to the expander 30. In this embodiment, the industrial boiler/furnace 60 is located between the combustor 20 and the expander 30. This allows optimal utilization of the infrared radiation 71 generated in the process. In an embodiment identical to FIG. 1, the infrared heat reflectors 50 redirects the infrared radiation 71 back to the industrial processing material 64, ensuring maximal utilization of infrared radiation 71 generated and optimal heat transfer rate into the industrial processing material. The infrared transparent glass 51 allows the infrared radiation 71 to interact with the industrial processing material 64 while maintaining separation so that the airflow 24 is not contaminated by the industrial processing material 64 and thus allows for use of an expander 30 following the industrial boiler/furnace 60 without risk. Additionally, as known in the art, the transparent glass (which can also be IR transparent ceramic or ceramic composite) has the significant advantage over traditional furnaces (particularly glass, cement, and recycled aluminum) in that waste heat recovery heat exchangers can be used to either preheat combustion air (downstream of compressor), bottom cycle power generation, or secondary thermal processes. The expander 30 creates electricity output 42, which can be used on- or off-site, and includes waste heat recovery 34 as known in the art. A distinct element of the invention is that combustion is virtually completed within the combustor 20 (i.e., prior to air flow 24 reaching the internal portion of the industrial boiler/furnace 60. Preferred combustion completion is greater than 60% before reaching combustor 20 discharge, particularly preferred is greater than 80% before reaching combustor 20 discharge, and specifically preferred is greater than 95% before reaching combustor 20 discharge.

Figure 8:
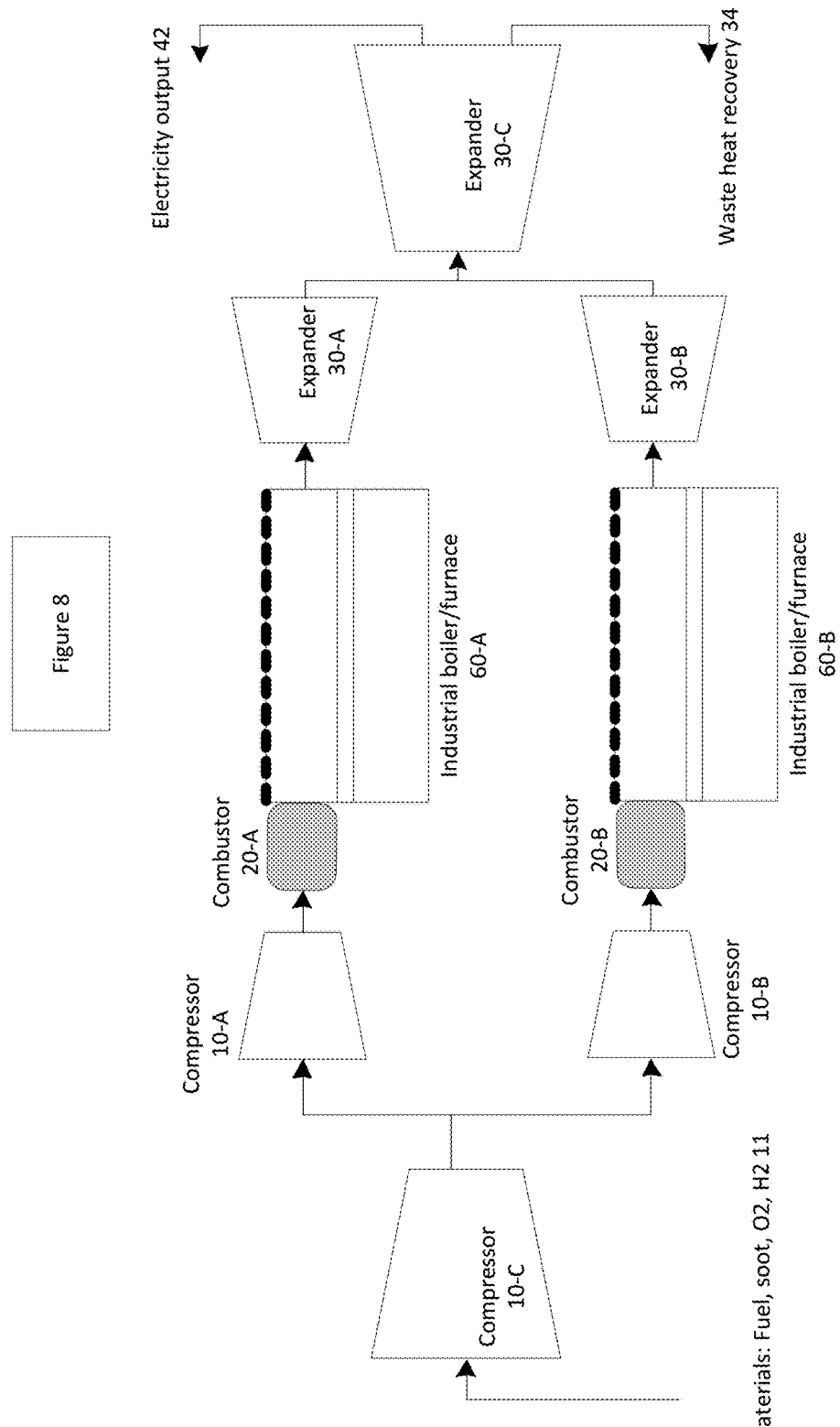
FIG. 8 is another schematic diagram feeding multiple industrial boilers/furnaces utilizing the buoyant combustor to replace the traditional burner and isolating the radiant combustion exhaust from the balance of the boiler/furnace system.

Turning to FIG. 8, FIG. 8 is a schematic diagram of another embodiment of an industrial boiler/furnace 60 utilizing a power generation engine as shown in FIG. 2, comprised of compressor 10 with intake materials 11, combustor 20, and expander 30 (with electricity output 42 and waste heat recovery 34), and flow with industrial boiler/furnace 60, identical to that shown in FIG. 7. In this embodiment, compressor 10-C is the common compressor which feeds compressors 10-A and 10-B. Compressors 10-A and 10-B act as booster compressors, as known in the art, to reach the supersonic speeds (preferably above Mach 1, and particularly preferred above Mach 2) required for optimizing energy density in combustor and optimizing system energy efficiency when including power generation. Similarly, expanders 30-A and 30-B act as booster expanders, as known in the art, acting prior to the common expander 30-C. Furthermore it is preferred that the compressors closest (10-A and 10-B) to the respective combustors (20-A and 20-B) in addition to the expander (30-A and 30-B) be smaller (i.e., have a lower compression ratio and expansion ratio respectively) due to the high temperatures and high radiant heat transfer closest to the hot combustors (20-A and 20-B). It is understood in the art that a thermodynamic cycle having both a 2 stage compressor and 2 stage expander is more energy efficient than a single stage turbine engine.

The preferred configuration has the entire combustor section "sandwiched" between an electromagnetic field such as to create a bias for plasmons and/or electron emission towards the solid-state conversion device. Furthermore, the particularly preferred embodiment is such that the operating voltage field when a phonon to electron coupling event takes place, the voltage becomes greater than dielectric breakdown voltage to yield free electron(s). The operating voltage can be pulsed at high frequency, preferably in the terahertz range.

The particularly preferred embodiment is such that the operating voltage field when a phonon to electron coupling event takes place, the voltage becomes greater than dielectric breakdown voltage to yield free electron(s). The operating voltage can be pulsed at high frequency, preferably in the terahertz range.

Additional effectiveness is obtained when the ceramic components contain Boron with a further preference of a concentration of Boron-10, relative to non-Boron-10 isotopes is greater than 80% (i.e., 4:1). And the particularly preferred concentration of Boron-10 isotopes to other boron isotopes is greater than 90% (i.e., 9:1). The specifically preferred concentration is greater than 95% (i.e., 19:1) Boron-10 isotopes to other boron isotopes.

One embodiment of the Boron-10, as used within the combustor, is in various forms with the preferred forms having a high diffusion barrier of phonons as a method of increasing the localized temperatures. One instance of a diffusion barrier of phonons is known in the art, including a vacuum gap in excess of 10 nm. Another case of a diffusion barrier is thermal barrier coatings as known in the art. One such form of Boron-10 as utilized in the invention is a Boron-10 ceramic, with the ceramic selected as known in the art. A preferred ceramic utilizes predominantly Boron-10 and is prepared from polymeric precursors including h-Boron-10 Nitride and cubic boron nitride as prepared using U.S. Pat. No. 6,153,061. Without being bound by theory, the h-Boron-10 Nitride is a superior insulative and particularly dense material thus minimizing the energy release being in the form of phonons. Another preferred embodiment utilizes Boron-10 nitride nanotubes, without being bound by theory enhances performance due to polarization and piezoelectricity to provide at least free electrons.

Yet another embodiment include Boron-10 nitride nanotubes with a Boron-10 nitride/carbon nanotube superlattice. Another embodiment includes Boron-10 compounds such as Boron-10 trifluouride.

Yet another embodiment of the ceramic components include electrides as a further method of increasing free electrons. Without being bound by theory, an iron-sulfur cluster has superior electron transfer characteristics to increase the mean free path of the high-energy "hot" electron. One embodiment of a high temperature electride is manganese blue as developed by scientists at Oregon State University in Corvallis including Mas Subramanian. A more preferred electride further includes iron at a 1 mole to 1 mole ratio with sulfur. The release of high-energy free electrons increases the nucleus imbalance, and the availability of surface charges to impact the piezoelectric and pyroelectric additions as noted below in the specification. The collection of high-surface charges, with a concentration, at points within the lattice structure yield energy concentrating phenomena as seen in sonoluminescence. As known in the art, a condition for blackbody radiation is that the size of the hot spot be greater than the photon matter interaction distance. Thus the concentrated surface charges can create localized temperatures in excess of 10,000 Kelvin (and up to 20,000 Kelvin).

Another embodiment is where the Boron-10 is intercalated in a zeolite. The preferred zeolite is ITQ-4, and the specifically preferred zeolite is further intercalated with cesium such as $Cs_xSi_{32}O_{64}$ "CsxSi32O64", and others where the cesium is either substituted with manganese, thorium, and Boron-10. In one instance, the cesium is intercalated such that x is at least 8. Another instance the cesium is intercalated such that x is at least 2. In yet another case, the cesium is intercalated relative to manganese at a 1:1 mole ratio. Another instance the cesium is intercalated relative to Boron-10 between a 1:1 and a 4:1 mole ratio. And another instance thorium is intercalated relative to Boron-10 between a 1:2 and a 5:1 mole ratio.

Yet another embodiment is the Boron-10 combined with thorium as a fluoride salt of thorium. The particularly preferred thorium salt is thorium boride (from Boron-10), and particularly preferred having particle size less than 50 nm. Another embodiment is a nanoscale thorium (having a particle size less than 50 nm), in reduced state, in which thorium is mixed with monatomic oxygen within the combustor. Particularly a combination of tungsten and thorium are mixed, preferably with thorium to tungsten on a mole to mole basis is between 100:1 and 10:1 and specifically preferred at 30:1. In one instance the Boron-10 to thorium ratio is between a 1:2 and a 5:1 mole ratio.

In yet another embodiment, the Boron-10 is combined with lithium. A preferred form of lithium is at least one of a lithium hydrogen matrix, lithium niobate, and lithium glycine carbonate. And a particularly preferred form of lithium is in the isotope form of lithium-6. In one instance the Boron-10 to lithium mole ratio is between a 5:1 ratio and a 1:1 ratio, such that the lithium is calculated on the basis of operable mass flow rate and instantaneous levels of lithium within the combustor.

Another embodiment, the Boron-10 has a particle size of less than 100 nm, and preferably less than 20 nm, is combined with ethyl ammonium nitrate "EAN". The particularly preferred embodiment further combines monatomic oxygen within the combustor. Without being bound by theory, the EAN limits the premature oxidation of boron-10 powder. In one instance the Boron-10 to EAN on a volume basis is between 1:2 and 1:10.

Yet another embodiment includes nanocrystals of piezoelectric materials. Particularly preferred piezoelectric materials include zinc oxide, barium titanate, and strontium titanate. Another embodiment includes nanocrystals of pnictides. Pnictides, as recognized in the art are materials based on iron and arsenide. An embodiment also includes nanocrystals of pyroelectric crystals, with preferred piezoelectric crystals including triglycine sulfate $(NH_2CH_2COOH)_3 \cdot H_2SO_4$, "TGS" or lithium tantalite. The TGS is particularly preferred due to the sulfur contribution in electrides, without being bound by theory, and enhancing free electrons. A further combination with strontium barium niobate is specifically preferred. Without being bound by theory, the addition of piezoelectric, pnictides, and pyroelectric increases the free electron or surface charge to levels in excess of traditional hot phonon energy states. In one instance, the mole ratio of Boron-10 to piezoelectric, pyroelectric, or pnictides is between 1:1 and 1:5. In another instance, the mole ratio of Boron-10 to piezoelectric, pyroelectric, or pnictides is between 1:10 and 1:20.

Another embodiment utilizes any of the above Boron-10 products, combinations thereof, by encompassing the combustor thermal energy as directly converted to electricity using an electromagnetic heat engine with magnetization and demagnetization frequency of greater than 100 Hertz. Electromagnetic heat engine as known in the art enables the high energetic states to be captured by the electromagnetic field prior to diffusing as hot phonons. In one instance the frequency is 10 kilohertz. Another case the frequency is 10 megahertz. And another case the frequency is in excess of 1 gigahertz. The particularly preferred frequency is greater than 1 terahertz. The fundamental objective, without being bound by theory, is for the frequency of the electromagnetic magnetization and demagnetization to be greater than the time required for the hot phonons to relax or diffuse such that the high-energy state realized from capturing energy by Boron-10 is converted into magnetic energy preferably over thermal energy.

The combination of monatomic hydrogen provides a higher energy state as compared to H2. Yet another form of fuel is monatomic hydrogen as present in the particularly preferred Brown's Gas. The combination of tightly bound hydrogen and externally applied forces extends the period of time in which the hydrogen remains within close proximity to the Boron-10. In one instance, the Boron-10 to hydrogen mole ratio is between 1:5 and 1:50.

One such method to increase the localized energy is to include Boron cermets such as boron carbide-copper cermet. The preferred utilization of boron cermets is to surround the combustor. Without being bound by theory, the doping of Boron cermets with silicon (Si) and/or germanium (Ge) improves the thermoelectric properties. The cermet can be replaced with pyrolytic hexagonal boron nitride. Yet another boron compound to surround the combustor is pyrolytic hexagonal boron nitride.

Superior results are achieved by utilizing a stronger force in a more concentrated area, particularly with the combustor area having a higher concentration of Boron-10 atoms. One embodiment of the generated force within the combustor is greater than 100 times the force of gravity. The more preferred embodiment has a centrifugal force as applied external force of greater than 1000 times the force of gravity. The particularly preferred embodiment has an force of greater than 100,000 times the force of gravity. And the specifically preferred embodiment within the combustor has a generated external force of greater than 1,000,000 times the force of gravity. An externally applied force can optionally is from any individual or jointly applied force including electromagnetic, centrifugal, and acoustic force. The particularly preferred acoustic force creates a standing wave within the combustor, and specifically preferred such that the standing wave resonates within the Boron-10 composition.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A radiant energy conversion system comprised of a high centrifugal buoyant combustor having a transparent material, a solid-state infrared energy conversion system, a pre-combustion air entering the high centrifugal buoyant combustor producing a post-combustor exhaust having a post-combustor exhaust temperature greater than 700 degrees Celsius, combustion internal of the combustion chamber yielding an emissivity greater than 0.20, a radiant flux greater than 100 kW per square meter emitting a high radiant energy towards the solid-state infrared energy conversion system through the transparent material and out of the post-combustor exhaust, and combustion completion greater than 60% before combustor discharge.

2. The radiant energy conversion system according to claim 1 wherein the radiant flux is greater than 300 kW per square meter and the emissivity is greater than 0.50.

3. The radiant energy conversion system according to claim 1 wherein the pre-combustion air is at a centrifugal force greater than 100 times the force of gravity.

4. The radiant energy conversion system according to claim 1 further comprised of a compressor operable to accelerate the pre-combustion air to a centrifugal force greater than 10,000 times the force of gravity.

5. The radiant energy conversion system according to claim 4 wherein the compressor is an inside-out compressor.

6. The radiant energy conversion system according to claim 1 is further comprised of an expander and a stator wherein the post-combustor exhaust is expanded in the expander operable to generate additional energy beyond the energy produced by the solid-state infrared energy conversion system.

7. The radiant energy conversion system according to claim 6 wherein the expander is an inside-out expander.

8. The radiant energy conversion system according to claim 1 wherein the pre-combustion air has at least 5 ppm of soot and/or soot precursors.

9. The radiant energy conversion system according to claim 1 is further comprised of at least one solid-state conversion device.

10. The radiant energy conversion system according to claim 9 wherein the at least one solid-state conversion device is a nanoantenna having a rectenna.

11. The radiant energy conversion system according to claim 10 wherein the rectenna is operable at a frequency greater than 1 terahertz.

12. The radiant energy conversion system according to claim 1 is further comprised of at least one of an electromagnetic or electrostatic field.

13. A radiant energy conversion system comprised of a pre-combustion air entering a high-centrifugal buoyant combustor having an infrared transparent glass or ceramic stator ring producing a post-combustor exhaust, having an industrial processing material section with a beam shaping nanoantenna within the industrial processing material, whereby the stator ring isolates the post-combustor exhaust air from the industrial processing material section, whereby the post-combustor exhaust temperature is greater than 700 degrees Celsius, and whereby the combustor has a combustion internal of the combustion chamber yielding an emissivity greater than 0.20, a radiant flux greater than 100 kW per square meter, and combustion completion greater than 60% before combustor discharge.

14. The radiant energy conversion system according to claim 13 wherein the stator ring is further comprised of a Boron having at least Boron-10.

15. The radiant energy conversion system according to claim 13 whereby the stator is an inner stator ring.

16. The radiant energy conversion system according to claim 13 whereby the stator is an outer stator ring.

17. The radiant energy conversion system according to claim 14 wherein the ceramic is prepared from polymeric precursors including h-Boron-10 Nitride and cubic boron nitride.

18. The radiant energy conversion system according to claim 13 wherein the ceramic is prepared as boron nitride nanotubes including boron nitride nanotubes having a boron nitride/carbon nanotube superlattice.

19. The radiant energy conversion system according to claim 13 wherein the ceramic is comprised of at least one of iron-sulfur clusters, manganese blue, zeolite, cesium, or thorium.

20. A method of using the radiant energy conversion system according to claim 13 further comprised of an electromagnetic heat engine with magnetization and demagnetization frequency of greater than 1 Gigahertz to produce electricity.

* * * * *